(12) United States Patent
Altendorf (10) Patent No.: US 7,227,124 B2
(45) Date of Patent: Jun. 5, 2007

(54) ILLUMINATION CONFIGURATION FOR IMAGING-TYPE OPTICAL ENCODERS

(75) Inventor: Eric H. Altendorf, Edmonds, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/157,357

(22) Filed: Jun. 20, 2005

(65) Prior Publication Data

US 2006/0284062 A1    Dec. 21, 2006

(51) Int. Cl.
*G01D 5/34* (2006.01)
(52) U.S. Cl. .................................. 250/231.13
(58) Field of Classification Search .......... 250/231.13–231.18; 356/614–618; 33/1 N, 33/1 PT
See application file for complete search history.

(56) References Cited

U.S. PATENT DOCUMENTS

| 5,539,519 | A | 7/1996 | Takagi et al. |
| 2003/0002039 | A1* | 1/2003 | Homer .................... 356/301 |
| 2004/0173737 | A1 | 9/2004 | Shimomura et al. |

OTHER PUBLICATIONS

Smith, W., *Modern Optical Engineering*, 3d ed., McGraw-Hill, 2000, Chapter 13.4, "The Design of Optical Systems: Particular," pp. 470-474.

Schubert, E.F. et al., "Visible LED Alternatives for High-Radiance Applications," *Proceedings of Light-Emitting Diodes: Research, Manufacturing, and Applications VII, SPIE* vol. 4996, Jul. 2003, pp. 208-220.

* cited by examiner

*Primary Examiner*—Thanh X. Luu
*Assistant Examiner*—Suezu Ellis
(74) *Attorney, Agent, or Firm*—Christensen O'Connor Johnson Kindness PLLC (57) ABSTRACT

An illumination configuration for imaging-type optical encoders is provided. The illumination configuration generates uniform brightness images of scales and two-dimensional structures when utilizing telecentric imaging optics in the encoder readhead. In one embodiment, a desirable uniform irradiance distribution is created across the field of view by illuminating with a collimated or quasi-collimated beam, but insuring that the illumination is sufficiently incoherent that potential self-images arising from periodic structures on the scale are suppressed. In one embodiment, the ratio of an effective emitter size to a focal length of the collimating lens falls within a selected range, so as to assure relatively uniform illumination across the field of view and still provide sufficiently incoherent illumination. In another embodiment, a diffuser is placed over the collimating lens, which assists in producing uniform illumination even when the direction of illumination varies relative to the scale due to misalignment between the readhead and the scale surface.

24 Claims, 7 Drawing Sheets

ILLUMINATION CONFIGURATION FOR IMAGING-TYPE OPTICAL ENCODERS

FIELD OF THE INVENTION

The present invention relates to imaging-type optical encoders, and more particularly, to an illumination configuration that generates desirable measurement images of one-dimensional and two-dimensional scales, including periodic scales.

BACKGROUND OF THE INVENTION

Various optical encoders are known that use a readhead having a relatively simple optical arrangement that includes a lens to provide an image of a scale pattern to a photodetector arrangement in the readhead. This type of system, which uses incoherent light to image a scale pattern onto an optical detector to thereby measure the relative or absolute displacement of the scale pattern, is called an imaging-type encoder. One such system is disclosed in U.S. Pat. No. 5,539,519, to Takagi et al., which is incorporated herein by reference. The system described in the '519 patent includes an encoder plate having a periodic slit pattern. A light source illuminates the slit pattern to form a primary fringe image. A lens projects the primary fringe image by a given magnification to form a secondary enlarged fringe image that shifts along a second plane. A fixed light receiving unit receives the shifting image through a fixed periodic mask pattern (an index grating) at the second plane. Some imaging-type optical encoder readheads are known that use a relatively simple optical arrangement that further includes a telecentric aperture. A telecentric aperture provides relatively constant magnification over a desired range of object distances.

Users generally prefer that the readheads and scales of optical encoders, including imaging-type optical encoders and displacement sensors, are as compact as possible. For example, a smaller optical encoder is more convenient to install in a variety of applications. However, reducing the size of readheads and scales generally makes their accuracy relatively less robust with respect to contamination, alignment, and other variations that may be expected in industrial environments. Thus, as the size of readheads and scales are reduced, in order to maintain accuracy as robustly as possible, each aspect of the encoder design becomes more critical, including the imaging system, the optical detector system, and the illumination system. In particular, the potential problems and improvements related to the illumination systems for small imaging-type optical encoders have been under-appreciated.

SUMMARY OF THE INVENTION

An illumination configuration for imaging-type optical encoders is provided. Encoders or other displacement sensing systems that use direct incoherent imaging of one-dimensional (1D) or two-dimensional (2D scale features can benefit from the scale or object image having a uniform irradiance (optical power/area) at the optical detector, which may be a custom photodetector array, or a 2D camera sensor, or the like. For example, in such a case, the signal amplitudes at the various photodetector elements are similar, which generally enhances the displacement measurement accuracy. This factor becomes relatively more critical when relatively fewer periods of the scale are imaged by relatively smaller readheads, since the resulting measurement signal averages fewer scale features, and therefore may become relatively more distorted by aberrations or variations in signal contributions that arise from individual scale features. Furthermore, it should be appreciated that for a relatively more uniform image, it becomes less likely that contamination or misalignment will obscure or displace a "high intensity" portion of the image that would otherwise contribute a disproportionate amount of the measurement signal. If such "high intensity" portions exist (in a non-uniform image), then the measurement accuracy is disproportionately reduced if they are obscured or displaced.

The scale or object illumination is a critical element in generating a uniform image. For imaging-type optical encoders that use a telecentric imaging system, the optimal illumination configuration may be one where the reflected or scattered light from the scale or object has a constant radiance (radiant power per unit solid angle per unit projected area), in the field of view (FOV) surrounding the optical axis. This differs from the Lambertian illumination distribution of scattered or reflected light, that is, constant brightness or radiance with respect to angle within the field of view (FOV), that is provided in many conventional imaging applications. For example, a Lambertian illumination distribution may result in situations where the source is re-imaged onto the imaging lens (see Koehler illumination, as described in *Modern Optical Engineering*, p. 471, Third edition, Warren Smith, McGraw-Hill, 2000). In telecentric systems, uniform image illumination can be difficult to achieve under a variety of circumstances.

An additional problem may arise because a periodic scale is to be illuminated and imaged. This problem concerns the coherence of the illumination. In particular, if the illumination is coherent or partially-coherent, a self-image arising from the periodic scale (also known as a Talbot image) may be present at the optical detectors. Although such a self-image is used intentionally in certain optical encoders, in the case of an imaging-type optical encoder, a well-formed or partially-formed self-image disrupts the intended "incoherent" scale image, and disrupts or destroys the accuracy of the imaging-type optical encoder. Thus, it may be desirable to design the illumination system of an imaging-type optical encoder such that the illumination is sufficiently incoherent over the field of view.

In accordance with one aspect of the invention, the illumination configuration generates uniform brightness images of scales and two-dimensional (2D) structures when using telecentric imaging optics.

In accordance another aspect of the invention, the illumination configuration generates substantially incoherent illumination over the field of view, and potential self-images are thereby suppressed.

In accordance with another aspect of the invention, in one embodiment, one method for generating a uniform illumination condition across a field of view (FOV) includes providing illumination with a collimated or quasi-collimated beam. Such a collimated beam can be formed by placing a relatively small illumination source emitting element at the focal plane of a collimating condenser lens that is used to provide the illumination to the FOV, wherein the illumination source emitting element is relatively small relative to the focal length of the collimating condenser lens. Some LEDs have effective emitting elements (which may or may not include the effects of an LED lamp lens) that are small enough relative to the focal length of the condenser lens that is used to provide the illumination to the FOV that they can be used directly. Larger sources can first be passed through a suitable pin-hole aperture to provide an emitting element that has a reduced size, if needed. Ideally, the field of view is significantly smaller than the diameter of the condenser lens. The ratio of the effective source or emitting element size w to the lens focal length f is related to both the degree of collimation and coherence in the illumination beam. It is generally undesirable to have the ratio be either too large or too small. It is desirable to have the ratio w/f fall within a range which assures uniform illumination across the field of view and which suppressed the coherence of the illumination light sufficiently in the field of view. In various embodiments, it may be advantageous that the ratio w/f falls within the range indicated by EQUATION 5, shown further below.

In accordance with another aspect of the invention, when illuminating a periodic scale pattern having a pitch P, in various embodiments it may be advantageous that the illumination is incoherent in the field of view over dimensions greater than 10*P, or more conservatively, greater than 6*P, or even more conservatively, greater than P.

In accordance with another aspect of the invention, to enhance or insure the uniformity of the illumination in the field of view, in various embodiments it may be advantageous that the ratio w/f satisfies the conditions expressed in EQUATION 4, shown further below.

In accordance with another aspect of the invention, to enhance or insure the uniformity of the illumination in the field of view, in various embodiments it may be advantageous that the dimension of the imaged field of view is less than the diameter of the clear aperture of the condenser lens, or more conservatively, substantially less.

In accordance with another aspect of the invention, in various embodiments a method for illuminating a telecentric system includes placing a diffuser in the path of the light emitted from a collimating or nearly-collimating lens. With proper selection of the diffuser characteristics, due to the collimated nature of the light exiting the lens and relatively small distance from the diffuser to the scale, this configuration may generate a uniform, diffuse illumination with the illumination concentrated in a beam diameter that is only slightly larger than the clear aperture of the collimating or nearly-collimating lens. This configuration is relatively insensitive to misalignments, and is less prone to coherence artifacts, even if the light source and condenser provide a high degree of collimation prior to the light reaching the diffuser. This configuration may be preferred if the light intensity from the source is sufficient, and if it is desired that misalignments of the encoder readhead have a minimal effect on the magnitude and uniformity of the nominal image intensity at the detectors. If misalignments are expected to be small and if the system requires as much usable light intensity as possible, then the embodiment without the diffuser may be preferred. In the embodiment with the diffuser, a high gain diffuser can be used to generate a hybrid configuration with some spread in the collimation, although higher spread in the collimation can also be achieved with the use of a Lambertian diffuser.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
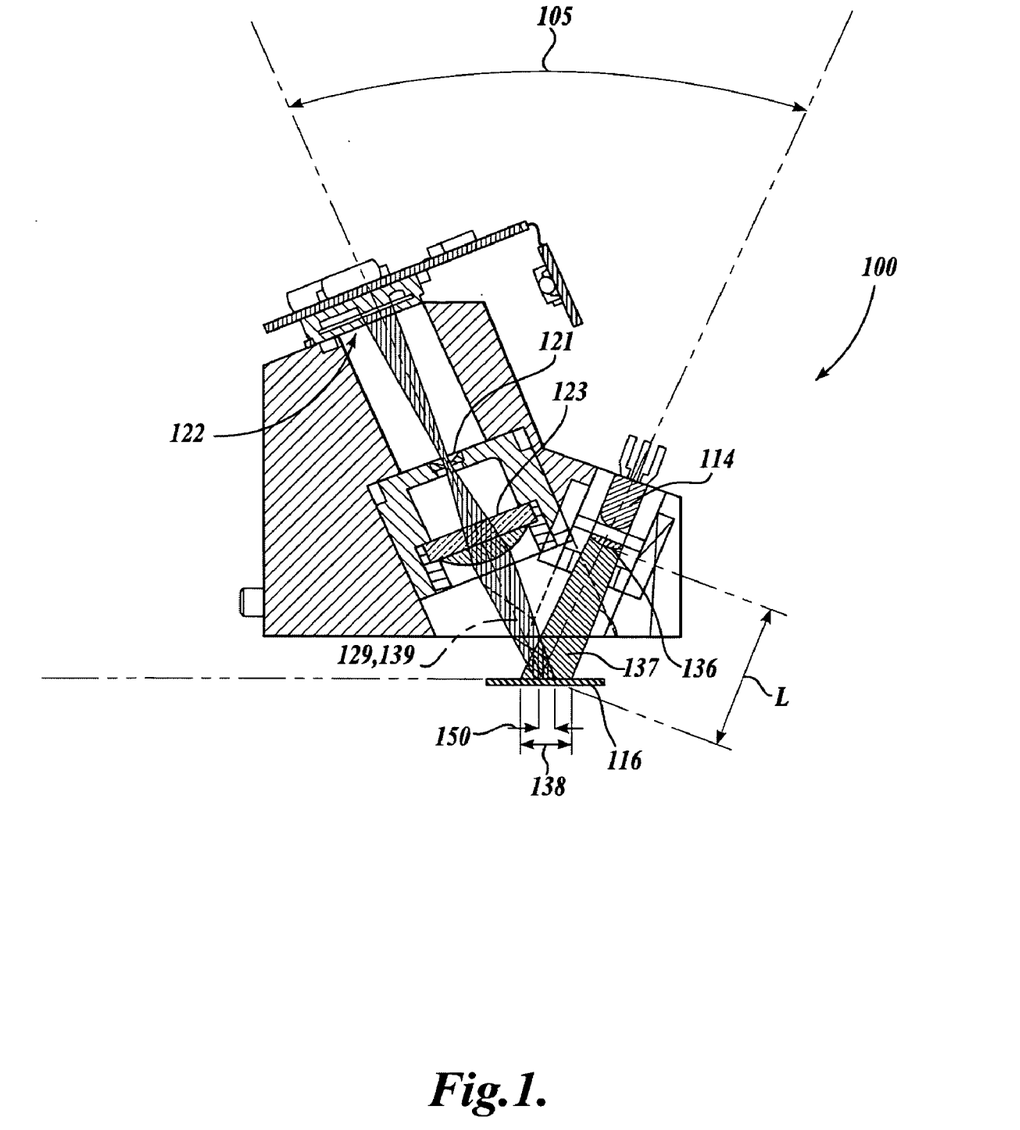
FIG. 1 is a diagram of a cross-sectional view along the measuring axis of a linear encoder illustrating the assembled optical components and optical path of one exemplary readhead that is operable with a reflective type scale.

FIG. 1 is a diagram of a readhead 100 that is operable with a reflective type scale grating 116, and that provides one example of an imaging-type optical encoder system which may incorporate the inventive illumination system features disclosed herein. The view of FIG. 1 is along a direction approximately parallel to the measuring axis of the scale grating 116 (that is, the measuring axis extends into and out of the plane of the figure), and approximately perpendicular to the optical axis of the readhead imaging system and the readhead illumination system, and illustrates the assembled optical components and optical paths of the system. In the reflective type configuration of the readhead 100, an illumination source 114 is located generally above the reflective scale grating 116, as is a imaging lens 123, an aperture 121 arranged in a telecentric configuration, and a detector assembly 122. The readhead 100 operates to illuminate the reflective scale grating 116 from above. In this embodiment, the illumination source 114 illuminates the scale grating 116 at an angle 105, which is exemplary only and not limiting. The illumination light 137 from the source 114 passes through a collimating or quasi-collimating illumination lens 136 to concentrate the available optical power in a limited illumination region 138 around the field of view (FOV) dimension 150 at the plane of the scale grating 116. The illumination lens 136 is shown to be arranged at a nominal distance L from the FOV at the scale grating 116, as described in greater detail below. The limited illumination region 138 may be large enough to ensure that the FOV is fully illuminated over the desired tolerance range for the gap, and various misalignments, between the readhead 100 and the scale grating 116.

In one embodiment, the reflective scale grating 116 comprises periodic grating lines and spaces. In various embodiments, the grating lines are fabricated in such a way as to reflect or diffusely reflect the light 137 from the illumination source 114, and the lens 123 focuses the reflected light 139, so as to provide corresponding brighter regions in the scale image received by the detector assembly 122. In contrast, the spaces are fabricated to either significantly absorb the light 137, reflect it away from the optical axis 129, or transmit it so that it is not received by the detector assembly 122, in various alternative embodiments. The spaces thus provide dark regions in the image received by the detector assembly 122 that strongly contrast with the bright regions provided by the reflecting or diffusely reflecting lines. In various exemplary embodiments, the scale grating pattern consists of substantially planar or flat lines and spaces. In various other embodiments, the scale grating pattern includes blazed grating elements that are designed with consideration to the angle(s) of incidence of the source light, in order to provide and/or enhance the contrast between the bright and dark regions in the image of the scale grating pattern received by the detector assembly 122. The readhead 100 and scale grating 116 are described in more detail in U.S. patent application Ser. No. 10/804,636, which is hereby incorporated by reference in its entirety.

Figure 2:
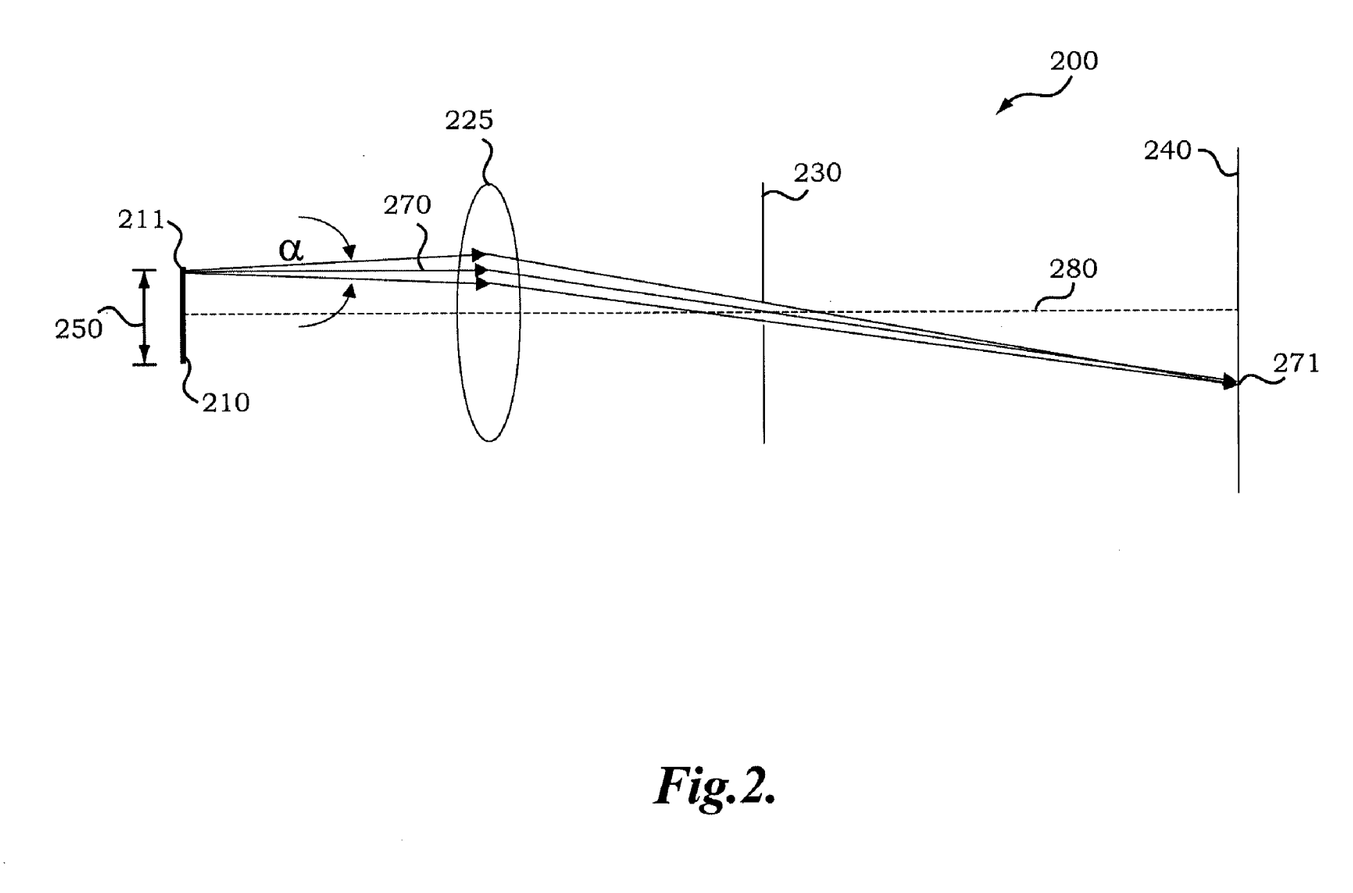
FIG. 2 is a diagram of a generic singly-telecentric imaging system.

FIG. 2 is a diagram of a generic singly-telecentric imaging system 200. The imaging system 200 includes a scale object 210, an imaging lens 225, a telecentric aperture 230, an optical axis 280, and a detector/image plane 240. The aperture stop 230 is placed along an optical axis 280, at the back focal plane of the imaging lens 225. FIG. 2 shows one typical respective principal ray 270 that leaves a respective object point 211 on the scale object 210 along a direction parallel to the optical axis 280, and passes through the center of the aperture 230. Each such respective principle ray 270 reaches the detector/image plane 240 at a corresponding respective image point 271. The aperture 230 also allows each such respective image point 271 to receive additional light rays that leave the respective object point 211 on the scale object 210 within a respective cone of light about the respective principal ray 270 (within an angle $\alpha$), as illustrated in FIG. 2.

As previously indicated, the accuracy of a position encoder may be enhanced when each respective image point 271 provides the same nominal image intensity for portions of the scale object 210 that have nominally the same reflectivity within a field of view (FOV) 250 of the imaging system 200. The imaging system 200 will fulfill this condition in an ideal manner when the illumination incident on the scale object 210 is configured uniformly, such that the same amount of energy is included in the illumination rays available to be reflected within the respective cone of light of each respective object point 211. It will be appreciated that the size of the telecentric aperture stop 230 and the spacing between the various optical elements along the optical axis 280 determine the angular spread (the angle $\alpha$) of the rays leaving the scale object 210 that are collected by the imaging lens 225 to provide the image intensity at each respective image point 271 at the detector/image plane 240.

Regarding miniature imaging-type encoders, as previously outlined, when a periodic scale object is illuminated with coherent or partially-coherent light, a self-image arising from the periodic scale (also known as a Talbot image) may arise at self-image planes at certain distances away from the plane of the periodic scale pattern, and weaker or blurred self-images may arise between those planes. Even if an encoder readhead is initially mounted at a distance from the scale that avoids the self-image planes, disturbance of the mounting or lack of flatness of the scale may alter the distance from the scale enough to introduce some degree of self-imaging. In the case of an imaging-type optical encoder, a well-formed or partially-formed self-image may disrupt the intended "incoherent" scale image, and destroy the accuracy of the imaging-type optical encoder. Thus, it may be desirable that the illumination provided for an imaging-type optical encoder is not only relatively uniform, as previously described, but that it is also sufficiently incoherent over the FOV, such that self-images do not arise. Due to the small dimensions and short optical path lengths associated with a miniature imaging-type encoder, coherence effects may arise from commonly used illumination sources unless special care is taken with the illumination configuration. However, by following certain design relationships outlined further below, such potential coherent illumination effects may be controlled or eliminated.

Another illumination consideration for imaging-type encoders is the power requirement. In general, lower power is better, provided that the illumination provides sufficient image brightness and contrast. Accordingly, it is generally desirable that the illumination light is not wasted. It should be appreciated that according to the discussion related to FIG. 2, for a telecentric imaging system, illumination that is reflected from scale object outside of the angle $\alpha$ will not reach the detector/image plane, and will be wasted. According to this criterion, well-collimated illumination that is reflected parallel to the optical axis of the imaging system is desirable. However, well-collimated illumination more readily contributes to coherence effects than illumination that is more diffuse, as described in greater detail below. Thus, there is a conflict between various desirable encoder illumination features. Certain design relationships outlined below provide desirable tradeoffs between these various features for miniature imaging-type encoders.

Figure 3:
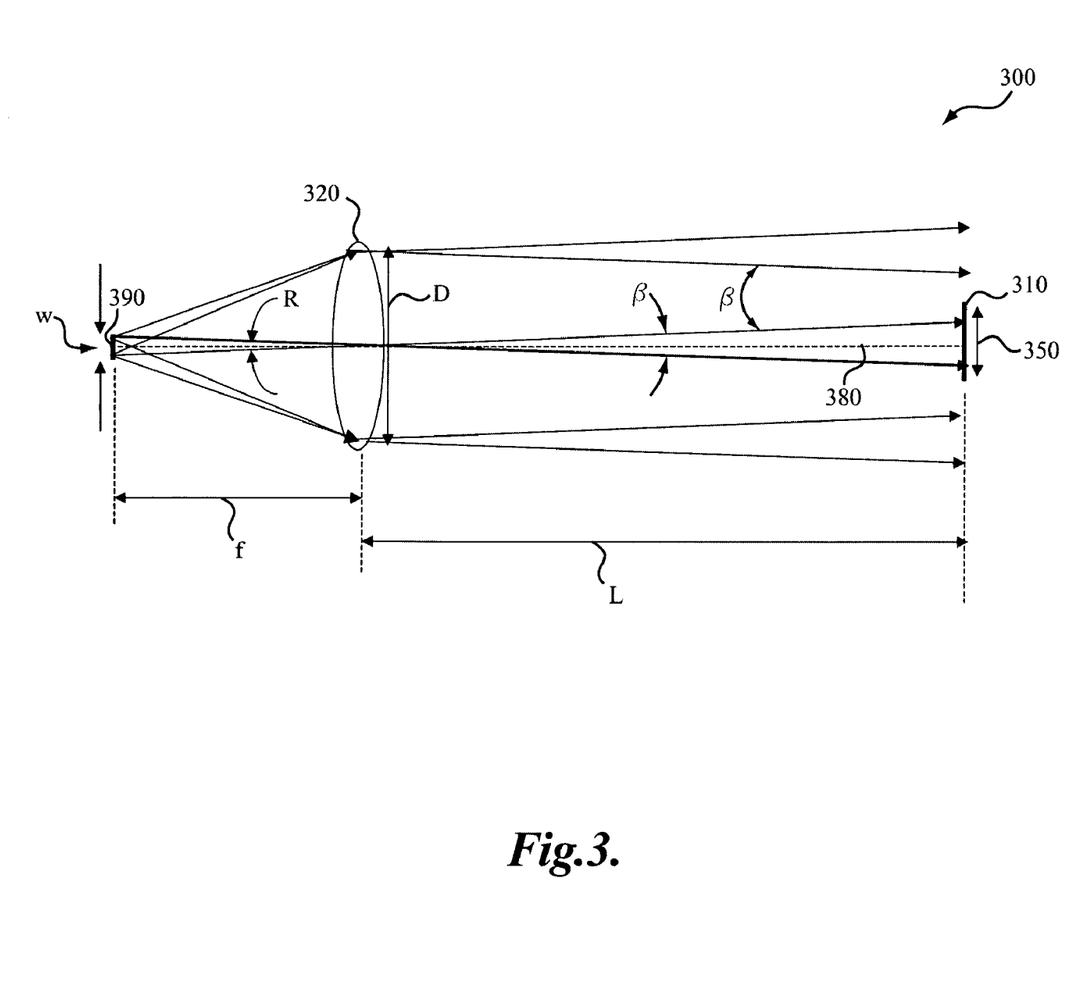
FIG. 3 is a diagram illustrating various parameters used to describe various embodiments of an illumination configuration for an imaging type optical encoder in accordance with the present invention.

FIG. 3 is a diagram of a first embodiment of an illumination configuration 300 for an imaging-type optical encoder in accordance with the present invention. The illumination configuration 300 includes a scale object 310 arranged at a distance L along an optical axis 380 from a condenser lens 320, and an illumination source 390 with an emitter area that has a nominal dimension w, arranged at a focal distance f from the lens 320. A FOV dimension 350 on the scale object 310 is defined by the characteristics of an optical system (not shown) that images the scale object 310. For example, the FOV may be defined by the magnification of the imaging optics and the size of the field stop (e.g., the detector dimensions). The FOV may also be limited based on the optical performance of the imaging lens. In this case a mechanical or software field stop may be provided to limit the FOV to a dimension smaller than the detector dimensions. Various considerations related to the FOV of a miniature imaging-type encoder are discussed further below. In any case, the illumination optics for a miniature imaging-type encoder can be advantageously designed for a particular FOV, as described below.

Ignoring small angular errors away from the optical axis, each point in the plane of the lens 320 will receive rays from the emitter area over a full angular range R. The angle R (in radians) is approximately equal to the ratio w/f. When the lens 320 is nominally a collimating lens, and the angle R is relatively small, the angle $\beta$ will be approximately equal to the angle R. Thus, each point in the FOV 350 on the scale object 310 will receive rays from the emitter area over a full angular range $\beta$ that is approximately equal to w/f. As previously outlined, lower power requirements are usually advantageous for miniature imaging-type encoders, and it is generally desirable that the illumination light is not wasted. Furthermore, for a telecentric imaging system, illumination that is reflected from scale object outside of the angle $\alpha$ will not reach the detector/image plane, and will be wasted. Therefore, it is generally desirable that in addition to fulfilling various design conditions as outlined below, an illumination configuration should provide an angle $\beta$ that exceeds the angle α by as little as possible (or not at all), to the extent that this is allowed by other design considerations.

Regarding the previously discussed coherence considerations, based on the van Cittert-Zernicke theorem a nominal "coherence extent" dimension d, over which the illumination from the illumination source 390 is at least partially coherent, can be estimated at the plane of the lens 320 (ignoring small angular errors away from the optical axis), as follows:

$$d = 1.22 \frac{\lambda}{(w/2f)} \qquad (\text{Eq. 1})$$

where λ is the nominal wavelength of the illumination source and w and f are the nominal emitter dimension and lens focal length, respectively, as exemplified in FIG. 3.

When the lens 320 is nominally a collimating lens, then due to the nearly-collimated nature of the light leaving the lens 320 and the relatively short optical path length L to the FOV that is typical of miniature imaging-type encoders, we can also approximate the size of the "coherence extent" at the plane of the FOV by the dimension d. To avoid coherent illumination, d must be less than the FOV dimension 350. For example, it may be desirable that d is at most a quarter of the FOV dimension, an eighth of the FOV dimension, or even less. Accordingly, an illumination system for a miniature imaging-type may desirably be configured such that:

$$\frac{w}{f} > 2.44 \frac{\lambda}{(FOV/k)} \qquad (\text{Eq. 2})$$

where FOV is a nominal FOV dimension and k is a number that is at least 1, and desirably at least 4, and even more desirably at least 8, if allowed by other design considerations. For most illumination sources, the average intensity-weighted wavelength of the output spectrum of the source may be taken as the wavelength λ. However, for sources that have an irregular output spectrum, it may be advantageous to fulfill the conditions of EQUATIONS 2, 3 and/or 5 (described further below) for any wavelengths that include enough energy to produce significant self-image effects.

With regard to suppressing self-images, the pitch P of a periodic scale pattern in the FOV on the scale object 310 may also be considered. Simulations of small gratings suggest that illuminating more than 10 adjacent line pairs with coherent illumination may generate substantial interference effects. Therefore, to suppress or eliminate self-images arising from a periodic scale pattern in the FOV, d should be at most 110*P, or less. For example, for a good design margin, it may be desirable that d is at most 6*P, or even 1*P or less. Accordingly, an illumination system for a miniature imaging-type may desirably be configured such that:

$$\frac{w}{f} > 2.44 \frac{\lambda}{(n*P)} \qquad (\text{Eq. 3})$$

where n is a number that is at most 10, and desirably at most 6, and even more desirably at most 1, if allowed by other design considerations.

Regarding previously discussed illumination uniformity considerations, we may consider a blur disk related to the source dimension and the illumination optical configuration, the blur disk having a dimension $d_{BLUR}=(w/f)*L$ at the FOV. The irradiance or intensity distribution across the FOV dimension 350 is then given by that portion of the convolution of the blur disk with the clear aperture D of the lens 320, that is sampled by the FOV dimension 350. If the size of the blur disk $d_{BLUR}$ is less than the FOV dimension 350 and the diameter D, and the diameter D is sufficiently greater than the FOV dimension 350, then the irradiance across the FOV will be approximately uniform. Accordingly, one set of conditions required for approximately uniform illumination at the FOV may be expressed as:

$$\frac{w}{f} < \frac{FOV}{L} < \frac{D}{L} \qquad (\text{Eq. 4})$$

where FOV is a nominal FOV dimension. For the configuration shown in FIG. 3, the FOV dimension 350 is ideally significantly smaller than the clear aperture diameter D of the condenser lens 320, if allowed by other design considerations. For example, it may be advantageous if the clear aperture diameter D is at least 1.5 times the FOV dimension, if allowed by other design considerations.

According to the foregoing considerations, it is generally undesirable to have the ratio w/f be either too large or too small. To summarize, when the expression of EQUATION 2 is violated, the source may approximate a virtual point source, and coherence effects and sensitivities to misalignments can become issues. When the expression of EQUATION 3 is violated, self-imaging arising from a periodic scale structure may disrupt the desired conventional scale image at the detector of the encoder. When the conditions of EQUATION 4 are violated, a lack of adequate collimation may cause a reduction in the image brightness at the edges of the field of view 350. For these reasons, a miniature imaging-type encoder may advantageously use an illumination system such as that shown in FIG. 3, configured such that the ratio w/f may fall within a range such as:

$$2.44 \frac{\lambda}{(FOV/k)} < \frac{w}{f} < \frac{D}{L} \qquad (\text{Eq. 5})$$

Ideally, the other desirable conditions of the expressions of EQUATIONS 3 and 4 will also be fulfilled. For a given value of w/f, from the right hand portion of EQUATION 5, one can also say that advantageously:

$$\frac{w}{f}*L < D \qquad (\text{Eq. 6})$$

This condition avoids the near re-imaging of the emitter source which occurs at unsuitably large values of the distance L. For the configuration shown in FIG. 3, wL/f is ideally significantly smaller than the clear aperture diameter D of the condenser lens 320, if allowed by other design considerations. In such a case, even if wL/f is approximately the same as the FOV dimension, approximately uniform illumination may still be provided across the FOV dimension.

With regard to satisfying the conditions of EQUATIONS 4 and/or 5, some LEDs have effective emitting elements (which may or may not include the effects of an LED lamp lens) that are small relative to the focal length of the condenser lens and can be used directly. Larger sources can first be passed through a suitable pin-hole aperture to provide an emitting element that has a reduced size, if needed.

A collimated, or nearly-collimated, illumination configuration has been previously discussed, where the effective plane of the emitter (which may include a limiting aperture, if required) is located approximately at the focal length of the condenser lens. In contrast, a configuration where the effective plane of the emitter is displaced from the focal length of the condenser lens causes the angular distribution and direction of the light leaving the lens to vary across the aperture of the lens and hence across the FOV. For small departures of the emitter from a location at the focal distance of the lens, such configurations may allow an additional degree of flexibility in modifying the degree of coherence and collimation. However, significant departures from the focal distance of the lens, will generally result in undesirable illumination non-uniformities, such as those shown in FIGS. 4 and 5.

Figure 4:
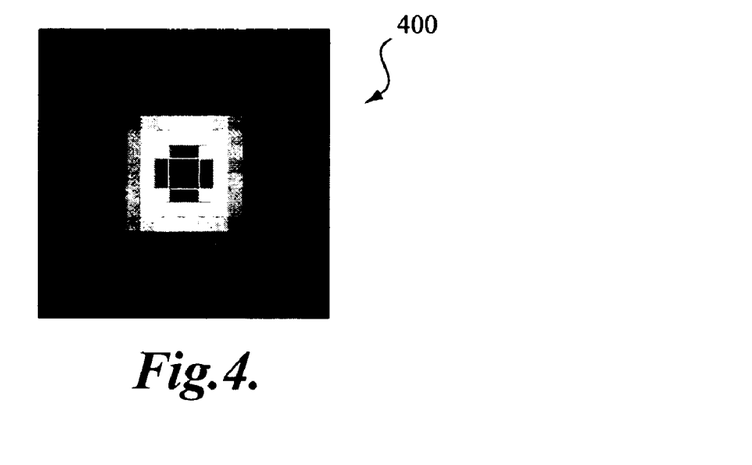
FIG. 4 is a diagram showing an irradiance distribution across an image plane for an optical system utilizing an LED with a focusing lens with an insufficient focal length.
Figure 5:
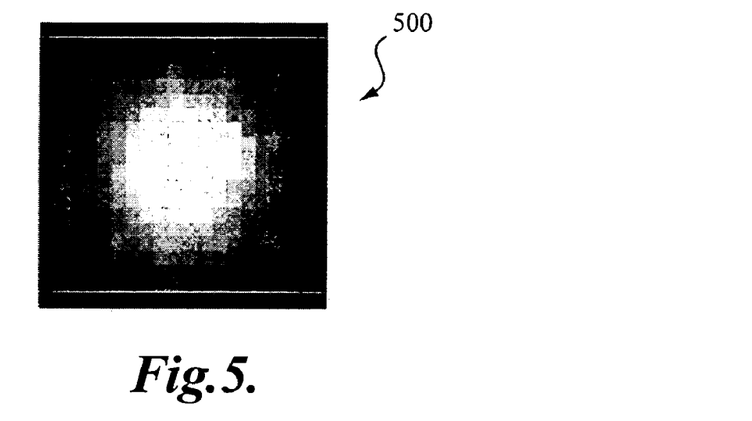
FIG. 5 is a diagram of an irradiance distribution across an image plane for an optical system utilizing an LED with a focusing lens with too long of a focal length.
Figure 6:
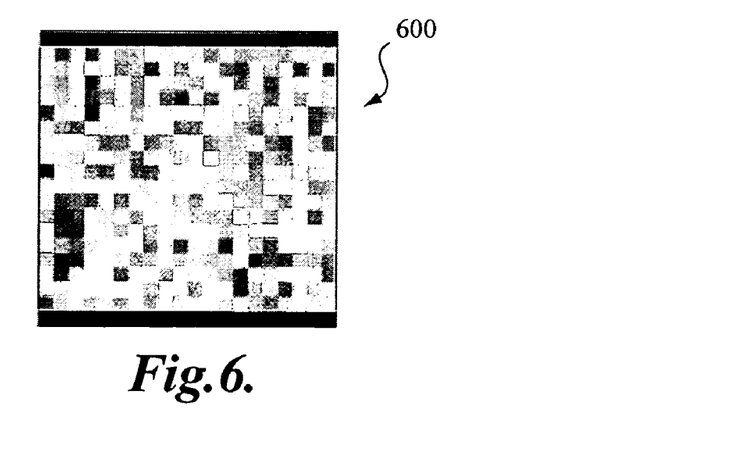
FIG. 6 is a diagram showing an irradiance distribution across an image plane for an optical system utilizing an LED with a focusing lens with an appropriate focal length.

FIGS. 4, 5 and 6 show irradiance distributions across a field of view in an image plane for respective illumination configurations. FIG. 4 is a diagram of an irradiance distribution 400 showing the results for an undesirable illumination configuration where the focal length is shorter than the distance from the emitter to the collimating condenser lens. As shown, an image of the emitter may be generated, with a reduction in irradiance near the center of the distribution due to an electrode structure that covers the center of the LED die. Such an illumination configuration for a miniature imaging-type encoder therefore produces non-uniform illumination and is not suitable.

FIG. 5 is a diagram of an irradiance distribution 500 for an undesirable illumination configuration where the focal length is longer than the distance from the emitter to the collimating condenser lens. As shown in FIG. 5, the irradiance at the center of the distribution is substantially higher than at the periphery of the distribution. Such an illumination configuration for a miniature imaging-type encoder therefore produces non-uniform illumination and is not suitable.

FIG. 6 is a diagram of an irradiance distribution 600 for a desirable illumination configuration where the focal length is approximately the same as the distance from the emitter to the collimating condenser lens, and the configuration complies with the conditions of EQUATION 4. As shown in FIG. 6, a desirable illumination uniformity is achieved.

Figure 7:
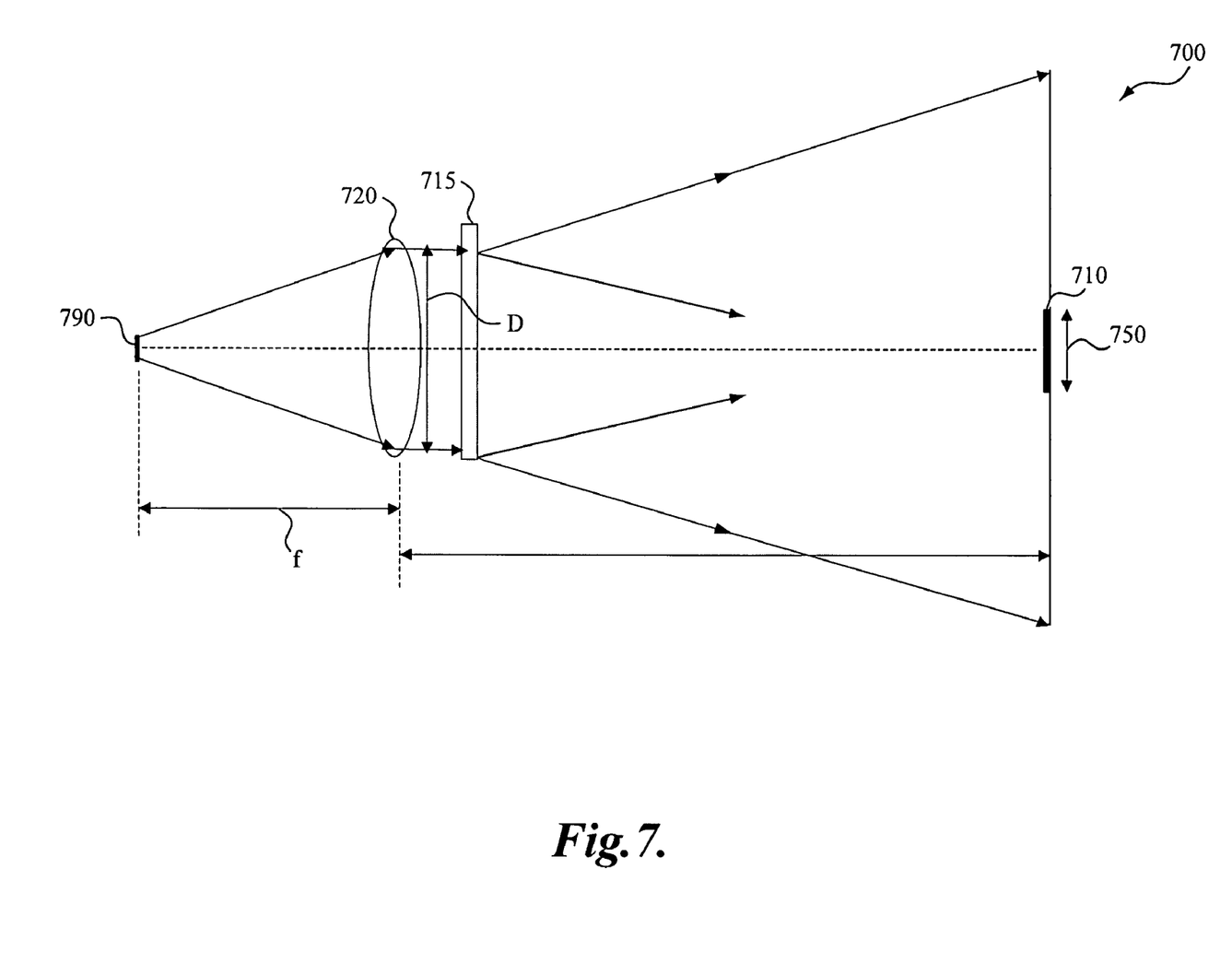
FIG. 7 is a diagram illustrating various parameters used to describe additional embodiments of an illumination configuration for an imaging type optical encoder in accordance with the present invention in which a diffuser is utilized.

FIG. 7 is a diagram of a second embodiment of an illumination configuration 700 for an imaging-type optical encoder in accordance with the present invention. The illumination configuration 700 is similar to the illumination configuration 300, and includes a scale object 710 arranged at a distance L from a condenser lens 720, which may be a collimating lens, and an illumination source 790 with an emitter area that has a nominal dimension w. A FOV dimension 750 on the scale object 710 is defined by the characteristics of an optical system (not shown) that images the scale object 710. In addition, the illumination configuration 700 includes a diffuser 715 located between the condenser lens 720 and the scale object 710. The diffuser 715 may be utilized to help reduce changes in the irradiance distribution due to changes in the pitch or roll alignment of the illumination system optical elements relative to the scale object 710. Such misalignments may displace an illumination distribution across the FOV, causing non-uniform portions at the edge of an illumination distribution to appear in the FOV. A diffuser may smooth and/or extend the edges of the distribution, reducing changes in the FOV illumination due to such misalignments. Due to the collimated or nearly-collimated nature of the light exiting the lens 720, and the relatively short dimension that is typical from the lens 720 and diffuser 715 to the scale object 710 of a miniature imaging-type encoder, the configuration 700 may generate a uniform diffuse illumination field at the scale object 710 that is approximately the same diameter as the diameter D of the clear aperture of the lens 720. Alternatively, the illumination field may be somewhat larger, by an amount that depends on the characteristics of the diffuser in combination with the dimension from the lens 720 and diffuser 715 to the scale object 710.

It will be appreciated that the illumination configuration 700 of FIG. 7 is similar to the illumination configuration 300 of FIG. 3, with the addition of the diffuser 715 after the collimating lens 720. The illumination configuration 700 may, in certain instances, be less efficient than the illumination configuration 300, but is also less sensitive to misalignments, and less prone to coherence artifacts.

For certain applications, the illumination configuration 700 may be preferred over the illumination configuration 300 if the light intensity from the source is more than adequate, and if sensitivities to misalignments are undesirable. If misalignments are expected to be small and if the system requires as much usable light intensity as possible, then the illumination configuration 300 may be preferred.

Figure 8:
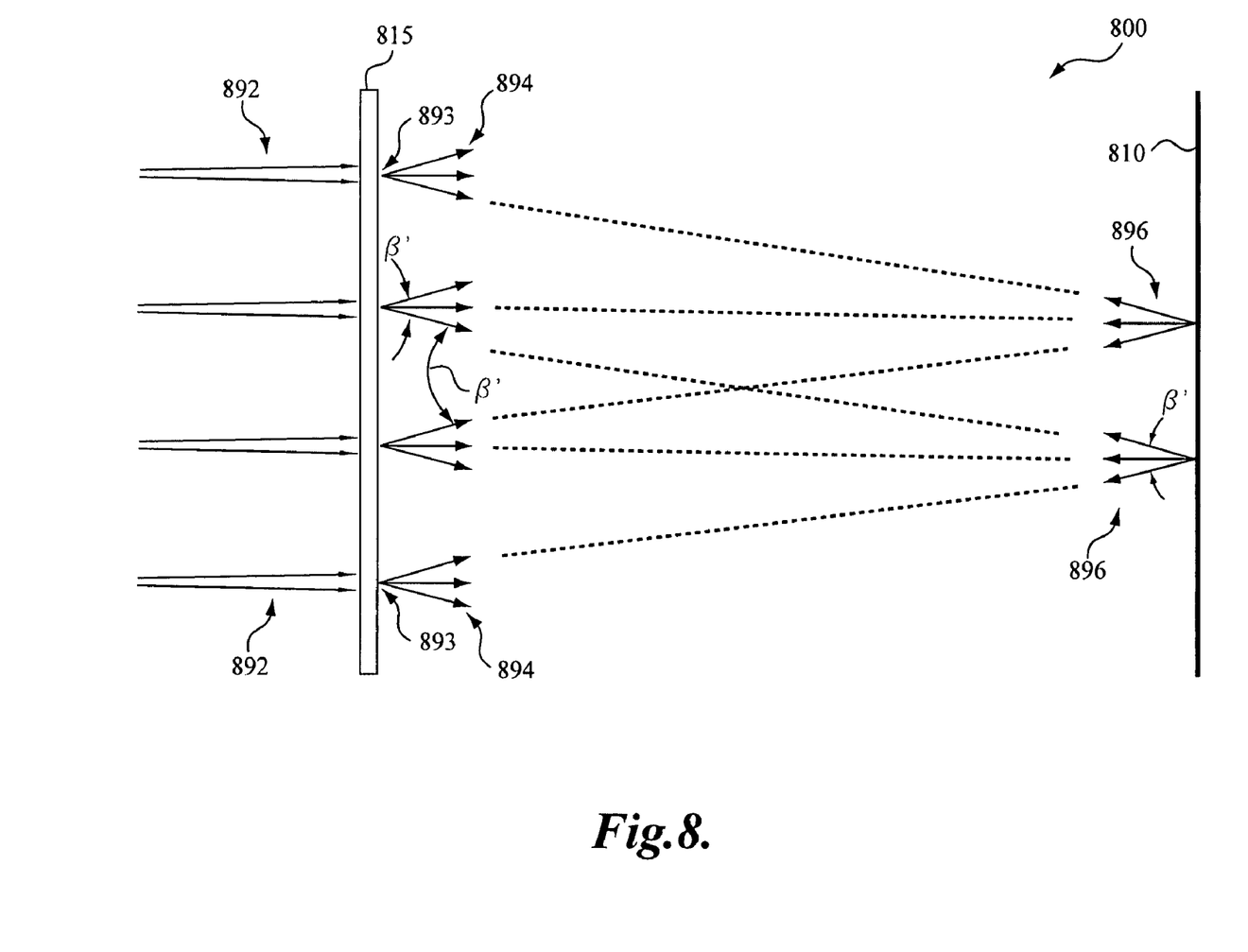
FIG. 8 is a diagram illustrating a desirable type of light ray scattering through a diffuser.

FIG. 8 is a diagram of an optical arrangement 800 illustrating the scattering of light through a diffuser 815. As noted above, the diffuser 815 may help reduce variation and/or non-uniformity of the illumination distribution due to pitch and/or roll misalignments. In other words, when alignment errors occur, the diffuser 815 helps assure that a uniform irradiance distribution is maintained. As illustrated in FIG. 8, light beams 892 from source(s) (such as an LED emitter) pass through the diffuser 815 at points 893 to form diffused light beams 894. The diffuser may be designed or selected such that the diffused light beams 894 concentrate most or all of the illumination energy within a desired full angular range $\beta'$, as shown in FIG. 8. Furthermore, as shown schematically in FIG. 8, the diffuser is desirably designed such that every point 893 provides nominally the same diffuse light scattering profile. The diffuser 815 is also positioned to receive a distribution of light beams 892 that is nominally uniform. Therefore, the bundle of light rays included in the angle $\beta'$ follows nominally the same angular intensity distribution and/or angular radiant flux distribution for each of the diffused light beams 894. Thus, each respective point in the FOV on the scale object 810 may receive the same distribution of rays from the respective diffused light beams 894 that provide its illumination. Each of the light beams 896 reflected by the scale object 810 will then also provide approximately the same angular intensity distribution over the full angular range $\beta'$, to provide a nominally uniform image light, as desired. As previously described with reference to FIG. 2, and further below reference to FIGS. 9A and 9B, a telecentric imaging system will "select" the rays of the light beams 896 that are aligned within the angle $\alpha$ relative to the optical axis of the imaging system. It should be appreciated that because the reflected light beams 896 at each point on the scale object 810 provide approximately the same angular intensity distribution as previously described, when the optical axis is misaligned relative to the scale object 810, the light received within the angle α relative to the misaligned optical axis will remain uniform over the FOV (at least when β' is equal to or greater than α). Thus, as illustrated by FIG. 8, the diffuser 815 helps produce uniform illumination, even when misalignments occur.

A diffuser may be advantageous for other purposes, as well, For example, it may be desirable to use various components that make it impossible to achieve the conditions outlined with reference to EQUATIONS 2–6. For example, it may be desirable to use components that are lower in cost, or that enable construction of a relatively smaller miniature imaging-type encoder. In such cases, the diffuser 715 may disrupt the undesirable collimation and coherence that otherwise may result from such components and/or construction, in order to provide a desirable uniform illumination, in addition to the other benefits outlined above. Also, if potential stray light and ghost image effects are generated as a side-effect of the structure of the imaging the optics and their supports, such effects may be mitigated by diffusing the illumination.

Regarding the angle β', one design consideration is that the angle β' should be large enough to provide reflected imaging rays generally along the optical axis of the imaging portion of an imaging-type encoder readhead over the full range of expected misalignment angles expected for the readhead relative the scale object 810. Another design consideration is that, as previously outlined, lower power requirements are usually advantageous for miniature imaging-type encoders, and it is generally desirable that the illumination light is not wasted. For a telecentric imaging system, illumination that is reflected from scale object outside of the angle α will not reach the detector/image plane, and will be wasted. Therefore, it is generally desirable that in addition to fulfilling various other design conditions outlined herein, a diffuser should provide an angle β' that exceeds the angle α by as little as possible, but large enough to accommodate the expected range of misalignments. The angle β' may be controlled by properly choosing the characteristics of the diffuser 815. Various optical component vendors can readily design and provide diffusers having characteristics corresponding to the various desirable design considerations outlined above. As one example, custom-designed miniature diffractive optical elements can be designed and fabricated to provide the desired diffuser characteristics. As another example, because the angle β' may be relatively small, uniformly textured diffusers having a suitable surface roughness may provide approximately the desired characteristics.

Figure 9A:
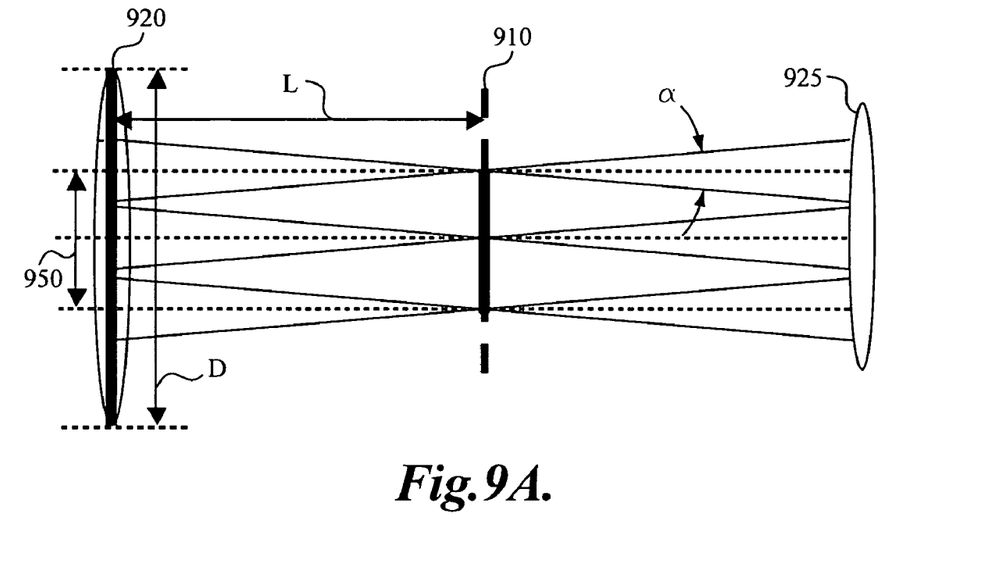
FIGS. 9A and 9B are diagrams illustrating a design consideration for various illumination configurations for imaging-type encoders.
Figure 9B:
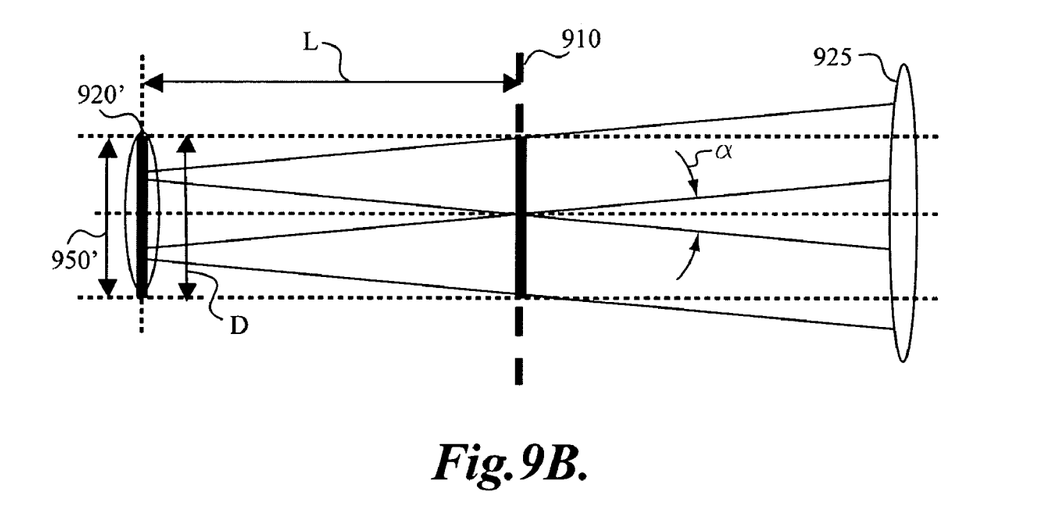

FIGS. 9A and 9B illustrate relevant portions of an illumination system in conjunction with an imaging system, in order to explain an additional design consideration regarding an illumination configuration for an imaging-type encoder. The consideration may apply to configurations with or without a diffuser. It will be understood that the "transmissive" configuration shown in FIGS. 9A and 9B may be a schematic representation of an "unfolded" reflective imaging-type encoder configuration, such as that shown in FIG. 1. In FIGS. 9A and 9B the separation between any diffuser and the lens 920 in FIG. 9A (or 920' in FIG. 9B) is ignored, and either or both components are shown schematically at a distance L from the scale object 910, which coincides with the distance to the FOV on the scale object 910 in FIGS. 9A and 9B. The angle α is the same as the angle α previously described with reference to FIG. 2, that is, rays at angles greater than the angle α do not contribute to the intensity distribution at the image plane of a telecentric imaging system 200, such as that shown in FIG. 2. Therefore, only the rays within the angle α are relevant to the following discussion.

FIG. 9A illustrates a configuration where the FOV dimension 950 is less than the clear aperture dimension D minus −Lα. Accordingly, each point in the FOV is uniformly illuminated, that is, receiving illumination over the full range of the angle α and reflecting that illumination over the full range of the angle α to project a nominally uniformly illuminated image through the telecentric imaging system lens 925. In contrast, FIG. 9B illustrates an undesirable configuration where the FOV dimension 950' is not less than the clear aperture dimension D minus −Lα. In particular, the FOV dimension 950' is equal to the clear aperture dimension D in this particular example. Accordingly, points at the edge of the FOV are undesirably non-uniformly illuminated, that is, they receive illumination over only half the full range of the angle α. Similarly, that illumination is nominally reflected over only half the range of the angle α, to project an image that has reduced illumination at its periphery through the telecentric imaging system lens 925. Accordingly, for a given dimension L and telecentric imaging system full admittance angle α, in addition to meeting other design considerations as outlined previously, it is advantageous to provide an illumination system configured such that $$D > FOV + (L * \alpha) \tag{Eq. 7}$$

if allowed by other design considerations.

In various embodiments, an illumination configuration may fulfill the various design conditions outlined above, either separately or in combination, to provide an approximately uniform illumination in the field of view. In various embodiments, an illumination uniformity may be provided such that the irradiance distribution varies by at most 15%, 10%, 5%, or even less, across the field of view. When the imaging system includes a telecentric imaging arrangement having a full admittance angle α, the illumination uniformity may include that for each respective angle that is equal to or less than α, the intensity distribution of the illumination provided to the FOV along that respective angle varies by at most 15%, 10%, 5%, or even less, across the field of view. In general, when the various design conditions outlined above are fulfilled in combination better and/or more robust illumination uniformity may be provided.

While the preferred embodiment of the invention has been illustrated and described, it will be appreciated that various changes can be made therein without departing from the spirit and scope of the invention.

The invention claimed is:

1. A device for measuring the relative displacement between two members, the device comprising:
   a scale extending along a measuring axis direction;
   a readhead designed to be positioned at a nominal distance L from the scale to receive operable scale image light from a field of view on the scale and provide an operable image of the scale when the scale is illuminated, the readhead comprising:
   an imaging portion that provides the operable image of the scale, the imaging portion comprising an imaging lens; and
   an illumination portion that provides illumination to the field of view, the illumination portion comprising a condenser lens having a focal length f and a light source having an emitting element having a width w, wherein the emitting element is nominally located at the focal length f from condenser lens, wherein:
the illumination portion is configured such that the illumination provided to the field of view is approximately uniform across the field of view and at least partially incoherent such that the operable image of the scale does not include self-imaging effects; and
the device is configured to fulfill at least one design criterion from a group of design criteria comprising:
(a) a design criterion wherein the field of view has a dimension FOV, the emitting element emits radiation having a wavelength $\lambda$, and the illumination portion is configured such that $w/f > 2.44*\lambda/(FOV/k)$, where k is a number that is at least 1,
(b) a design criterion wherein the scale includes a periodic grating structure having a pitch P, the emitting element emits radiation having a wavelength $\lambda$, and the illumination portion is configured such that $w/f > 2.44*\lambda/(n*P)$, where n is a number that is at most 10,
(c) a design criterion wherein the imaging portion comprises a telecentric imaging arrangement having a full admittance angle $\alpha$ and, for each respective angle that is equal to or less than $\alpha$, the intensity distribution of the illumination provided to the field of view along that respective angle varies by at most 15% across the field of view,
(d) a design criterion wherein the imaging portion comprises a telecentric imaging arrangement having a full admittance angle $\alpha$, the field of view has a dimension FOV, the condenser lens has a clear aperture D, and the device is configured such that $L < (D-FOV)/\alpha$, and
(e) a design criterion wherein the illumination portion further comprises a diffuser positioned to receive light from the condenser lens and provide the illumination to the field of view.

2. The device of claim 1, wherein the illumination provided to the field of view has an irradiance distribution that varies by at most 15% across the field of view.

3. The device of claim 2, wherein the illumination provided to the field of view has an irradiance distribution that varies by at most 10% across the field of view.

4. The device of claim 2, wherein the illumination provided to the field of view has an irradiance distribution that varies by at most 5% across the field of view.

5. The device of claim 1, wherein at least the design criterion (c) is fulfilled.

6. The device of claim 5, wherein for each respective angle that is equal to or less than $\alpha$, the intensity distribution of the illumination provided to the field of view along that respective angle varies by at most 5% across the field of view.

7. The device of claim 1, wherein at least the design criterion (a) is fulfilled.

8. The device of claim 7, wherein k is at least 4.

9. The device of claim 8, wherein k is at least 8.

10. The device of claim 7, wherein the lens has a clear aperture D and w/f is less than D/L.

11. The device of claim 10, wherein w/f is less than FOV/L.

12. The device of claim 11, wherein D is at least 1.5*FOV.

13. The device of claim 1, wherein at least the design criterion (b) is fulfilled.

14. The device of claim 13, wherein n is at most 6.

15. Device of claim 14, wherein n is at most 1.

16. The device of claim 1, wherein the light source comprises one of an LED, an LED included an LED lens, and a light source including a limiting aperture.

17. The device of claim 1, wherein at least the design criterion (d) is fulfilled.

18. The device of claim 1, wherein at least the design criterion (e) is fulfilled and the illumination provided to the field of view has an irradiance distribution that varies by at most 15% across the field of view.

19. The device of claim 18, wherein D is at least 1.5*FOV.

20. The device of claim 18, wherein the illumination provided to the field of view is has an irradiance distribution that varies by at most 5% across the field of view.

21. The device of claim 18, wherein the imaging portion comprises a telecentric imaging arrangement having a full admittance angle $\alpha$ and, for each respective angle that is equal to or less than $\alpha$, the intensity distribution of the illumination provided to the field of view along that respective angle varies by at most 15% across the field of view.

22. The device of claim 21, wherein for each respective angle that is equal to or less than $\alpha$, the intensity distribution of the illumination provided to the field of view along that respective angle varies by at most 5% across the field of view.

23. The device of claim 1, wherein at least the design criteria (a) and (c) are fulfilled.

24. The device of claim 1, wherein at least the design criteria (c) and (e) are fulfilled.

* * * * *

UNITED STATES PATENT AND TRADEMARK OFFICE
CERTIFICATE OF CORRECTION

PATENT NO. : 7,227,124 B2
APPLICATION NO. : 11/157357
DATED : June 5, 2007
INVENTOR(S) : E.H. Altendorf It is certified that error appears in the above-identified patent and that said Letters Patent is hereby corrected as shown below:

| COLUMN | LINE | ERROR |
| --- | --- | --- |
| 14 (Claim 16, | 19 line 2) | "included" should read --including-- |
| 14 (Claim 20, | 30 line 2) | "view is has" should read --view has-- |

Signed and Sealed this

Eleventh Day of December, 2007

JON W. DUDAS
*Director of the United States Patent and Trademark Office*